(12) United States Patent
Schell

(10) Patent No.: US 7,292,957 B1
(45) Date of Patent: Nov. 6, 2007

(54) COST EFFICIENT PERFORMANCE STATISTICS GATHERING USING LOGARITHMIC INDEXING

(75) Inventor: John C. Schell, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 355 days.

(21) Appl. No.: 11/043,764

(22) Filed: Jan. 26, 2005

(51) Int. Cl.
*G06F 11/30* (2006.01)
(52) U.S. Cl. .................. 702/182; 707/200; 709/220; 709/223; 709/230
(58) Field of Classification Search ................ 702/182; 707/8, 10, 201, 200; 709/203, 219, 223, 709/220, 230; 714/25, 56
See application file for complete search history.

(56) References Cited

U.S. PATENT DOCUMENTS

| 4,432,057 A | * | 2/1984 | Daniell et al. ................. 707/8 |
| 4,897,782 A | * | 1/1990 | Bennett et al. ............... 707/10 |
| 5,204,955 A | * | 4/1993 | Kagei et al. .................. 714/55 |
| 5,367,698 A | * | 11/1994 | Webber et al. .............. 709/203 |
| 6,175,848 B1 | | 1/2001 | Seaman et al. |

OTHER PUBLICATIONS

Mohamed Dekhil, et al., "Remote Management Services Over the Web", Hewlett Packard, Software Technology Laboratory, May 2000, pp. 1-15.
Andrea Westerinen, "CIM Schemas The Core and Common Information Models", Distributed Management Task Force, Inc., DMTF 2002 Developers' Conference, Jun. 10-13, 2002, pp. 1-53.
Andrea Westerinen and Jim Davis, "WBEM Standards", Distributed Management Task Force, Inc., DMTF 2002 Developers' Conference, Jun. 10-13, 2002, pp. 1-20.
"CIM FAQs", About the DMTF, Distributed Management Task Force, Inc., http://www.dmtf.org/about/faq/cim.php, retrieved from the Internet URL on Jun. 5, 2003, pp. 1-4.
"Common Information Model (CIM) Core Model", Version 2.4, DMTF White Paper, Distributed Management Task Force, Inc., Aug. 30, 2000, pp. 1-54.
"Understanding the Application Management Model", CIM Version 2.6, Document Version 1.1, CIM Application White Paper, Preliminary, Distributed Management Task Force, Inc., May 25, 2002, pp. 1-58.
Andrea Westerinen, "What Is Policy and What Can It Be?", CISCO Systems, IEEE Policy 2003 Conference, pp. 1-35.
Wally Mead, "What is WMI and How Does SMS 2.0 Use It?", Microsoft Support Services, Oct. 11, 1999, pp. 1-35.

* cited by examiner

*Primary Examiner*—Michael P. Nghiem
*Assistant Examiner*—Hien Vo
(74) *Attorney, Agent, or Firm*—Willaim J. Kubida; Michael C. Martensen; Hogan & Hartson LLP

(57) ABSTRACT

A system for a distributed computing network for managing instrumentation information from a plurality of network-connected managed entities. One or more instrumentation processes are coupled to each of the network-connected managed entities and configured to gather performance metric values. A first classification process is responsive to information describing a type of input/output operation being performed and is configured to select one or more counters based upon the type of input/output operation being performed. A second classification process is coupled to receive a performance metric value from the one or more instrumentation processes. The second classification process is responsive to a computed logarithm of a measured value of at least one metric to select and increment a particular counter of the one or more counters selected by the first classification process.

19 Claims, 4 Drawing Sheets

COST EFFICIENT PERFORMANCE STATISTICS GATHERING USING LOGARITHMIC INDEXING

BACKGROUND OF THE INVENTION

1. Field of the Invention

The present invention relates, in general, to performance monitoring, and, more particularly, to software, systems and methods for managing performance statistics using logarithmic indexing.

2. Relevant Background

With the dramatic increase in the use of computing devices to perform tasks in business, the computer networks that connect these devices have become continually more complex. The growing use of computer networks is making the management of computer networks more critical to day to day business operations. Further, the increased reliance on complex networks makes it increasingly important to ensure that system components are configured to operate at or near peak performance and that components of the distributed computer system continue to operate efficiently as varying demands are placed on the system. Administrative and service personnel use performance statistics to tune system parameters, tune component configuration, and continually analyze the system and its components so as to identify bottlenecks and improve performance.

Although complex, distributed computer systems are made up of a number of component subsystems that work cooperatively. The subsystems contribute to the overall system performance. With the complexities of systems and subsystems, the degrees of freedom enabled by storage virtualization, mulitpathing, fabric interconnections and the like, it is difficult to obtain a suitable analysis without sufficient knowledge of the system at a fine level of granularity. The tasks of measuring, monitoring and managing overall system performance are impacted by performance statistics related to component subsystems. However, conventional performance monitoring systems are better at monitoring overall system performance and have less than desirable ability to monitor performance statistics at a subsystem level.

In a distributed computing system performance is affected by the particular manner in which resources are allocated, the physical and logical paths that are defined between those resources, and the services and software implemented by the computing system, as well as a variety of other factors. Understanding the effects of each of these factors, as well as the interaction between these factors, is necessary when a system is being designed, when a system design is being validated, and when the test equipment requirements for validating a system are being determined. The ability to measure performance at a low level of granularity (e.g., at a subsystem or lower level) is desirable because it simplifies the design, validation, and test requirements.

In complex systems there is a continuing need to provide granular performance data to assist in the analysis, management and improvement of performance behavior. Examples of the use of performance data include fault analysis, configuration, accounting, performance and security management in distributed computing networks. In many cases computer systems are sold in conjunction with service level agreements (SLAs) that provide for specified performance levels. SLAs specify measurable criteria against which the performance of a resource can be compared. A resource may be any component in a distributed computing system such as computers, storage devices, switches, routers and the like. A resource may also refer to software or services implemented in the distributed system such as a web server, database server, or application server. In other words, a workstation, a server, a router, an application on a server, a network connection and the like all may be resources. To operate under an SLA, service providers attempt to allocate resources, design physical and logical connections between devices, and implement various services and applications in a manner that satisfies the criteria set out in the SLA. Accordingly, efficient collection of performance statistics is increasingly important.

In order to perform distributed system management it is necessary to have accurate and complete information about the system components such as networking and computing equipment, and services provided by those devices. However, the costs associated with gathering and managing performance data (e.g., terms of system resources) make the implementation of performance instrumentation prohibitive. Increased granularity means that the quantity of performance data that is collected and must be managed becomes quite large. The quantity of data escalates even further when the variety of types of data that are collected is increased. Accordingly, a need exists for systems, methods and software that enable collecting performance statistics in a cost-efficient manner.

SUMMARY OF THE INVENTION

Briefly stated, the present invention involves using logarithmic indexing for collecting, storing and managing performance data for input/output subsystems of a network such as a data communication network, local area network, wide area network, and the like. A management system for a distributed computing network having a management console with interfaces for accessing instrumentation information from a plurality of network-connected managed entities. One or more instrumentation processes are coupled to each of the network-connected managed entities and configured to gather performance metric values. A first classification process is responsive to information describing a type of input/output operation being performed and is configured to select one or more counters based upon the type of input/output operation being performed. A second classification process is coupled to receive a performance metric value from the one or more instrumentation processes. The second classification process is responsive to a computed logarithm of a measured value of at least one metric to select and increment a particular counter of the one or more counters selected by the first classification process.

In another aspect, the present invention involves a method for collecting performance statistics by accessing instrumentation information from a plurality of network-connected managed entities. In response to completing a particular input/output operation, a set of counters comprising one or more counters is identified based upon the type of operation that was completed. In response to completing the particular input/output operation, a particular counter is selected from the identified set of counters based upon a computed logarithm of a measured value of at least one metric. The selected counter is incremented.

DETAILED DESCRIPTION OF THE PREFERRED EMBODIMENTS

The present invention is illustrated and described in terms of a performance monitoring and reporting application for use in complex communication networks. However, performance monitoring is used in a variety of applications including reporting system performance, implementing service level agreements (SLAs), system configuration tuning, system design verification, troubleshooting, benchmarking and configuration of applications that are implemented by the system. Accordingly, the present invention is readily adapted to implement these and other applications.

Systems and mechanisms in accordance with the present invention are useful for monitoring and managing performance of a computer system or networks of communication systems, be it a local computer or a number of computers in an enterprise. In its simplest terms, distributed system management is little more than the collecting data about the state of a managed object on the computer system and altering the state of the managed object by changing the data stored about the object. A managed object can be a hardware entity, such as a memory array, port, or disk drive. A managed entity can also be a software entity, such as a service, user account, or page file. In particular embodiments of the present invention performance statistics can be gathered at almost any node and nexus within a system as well as any points in the software stack that lie beneath the application. This includes file systems, host-based volume managers, device drivers, host bus adapters (HBA's, by HBA and by individual ports of an HBA) switches (by switch and by individual ports within a switch), virtualization engines (by virtual logical unit number or "LUN"), array controllers (e.g., RAID controllers by controller ID and by LUN), disk drives, and the like.

Figure 1:
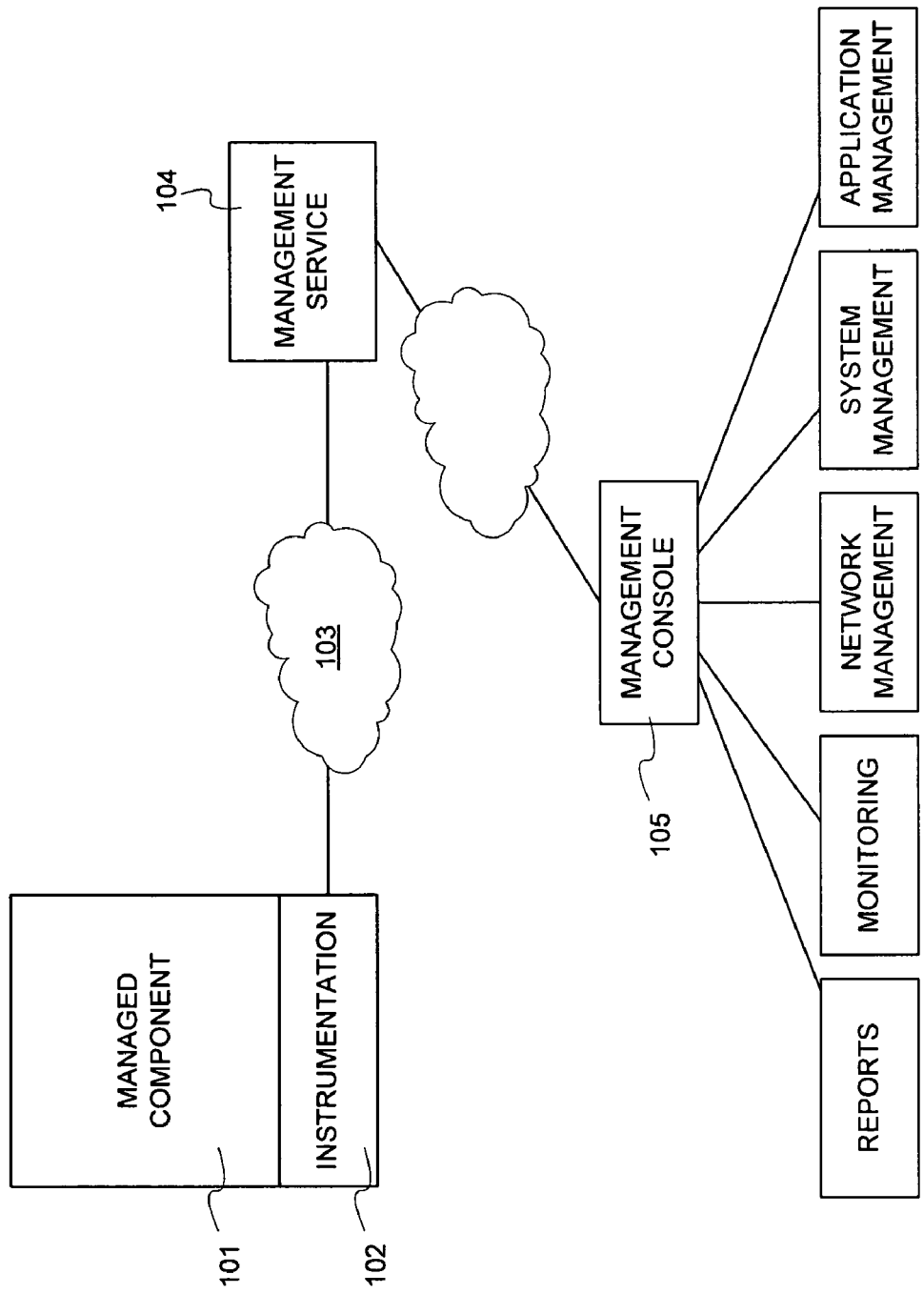
FIG. 1 shows a networked computer environment in which the present invention is implemented.

FIG. 1 shows an exemplary computing environment 100 in which the present invention may be implemented. A typical system would comprise a plurality of managed components 101 including hardware devices, application software, operating system software, register values, and the like. Managed components 101 are associated with some form of instrumentation 102. Instrumentation comprises refers to the set of hardware, software, and communication services that produce, collect, and transport information about the managed component to a management system. Instrumentation takes a great variety of forms. A desktop computer or workstation might use an operating system service as instrumentation, for example. In computer systems and hardware devices instrumentation may include basic input output system (BIOS) or interface logic that provides information about the monitored system.

In FIG. 1, the instrumentation information is communicated to a management service 104. In the example of FIG. 1, management service 104 is a remote management service communicating over network 103. However, more generally the management service can be implemented in any computer including the same machine that implements the managed component. Also shown in FIG. 1 is management console 105 that implements a user interface for accessing and using the management services. Again, although management console 105 is illustrated as remote from management services 104, it is contemplated that the management console would be implemented on the same computer system as services 104. Management console 105 supports any number of applications for manipulating, presenting, and analyzing the instrumentation information. Further, management console 105 may provide services such as monitoring, network management, system management, application management, and the like using the instrumentation information.

Figure 2:
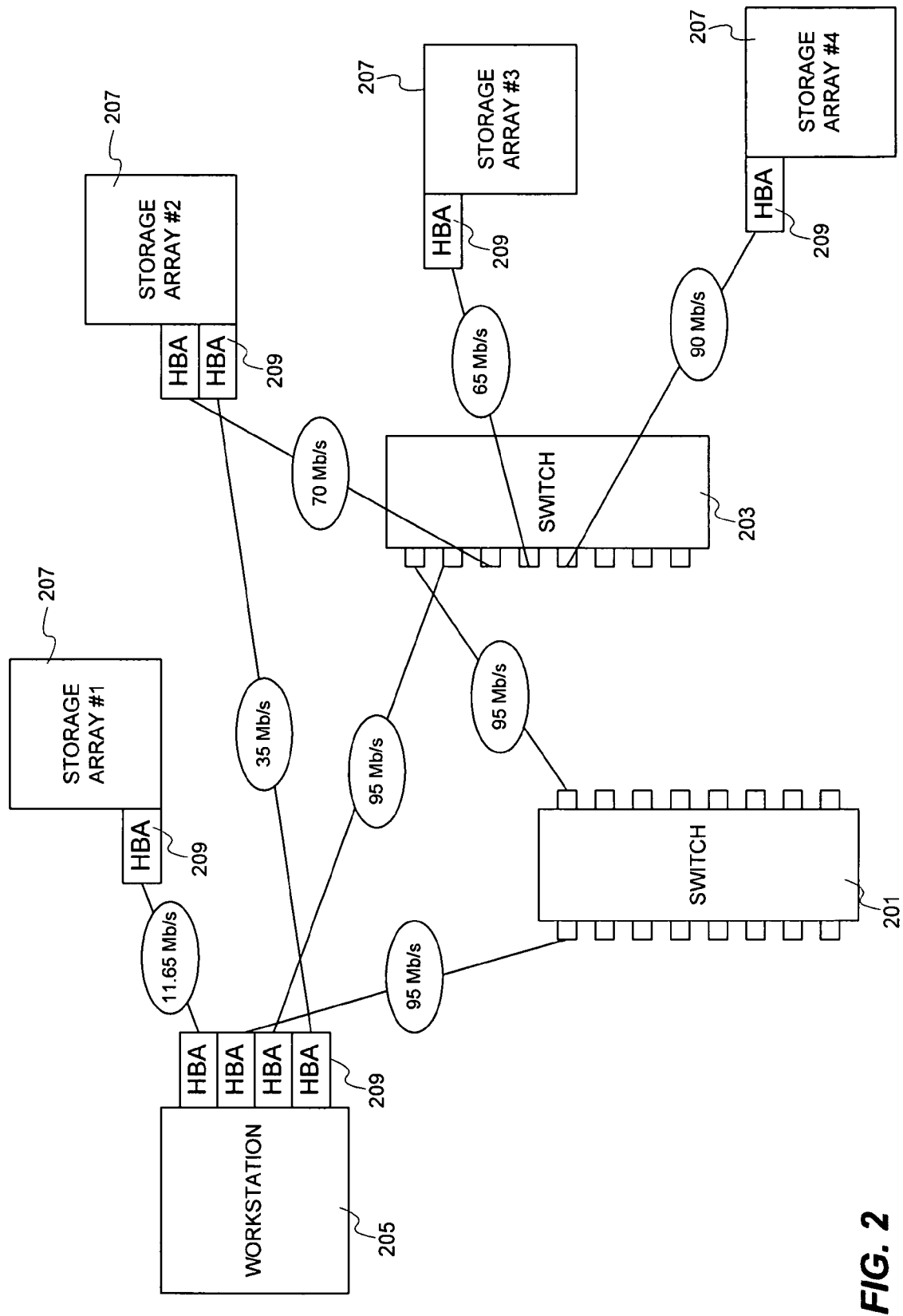
FIG. 2 shows a more specific environment in which the present invention is implemented.

FIG. 2 illustrates a more specific implementation in which a distributed computing system comprises a plurality of storage arrays 207 coupled by switches 201 and 203. Storage arrays 207 comprise any of a variety of available storage products such as a Sun StorEdge products from Sun Microsystems, Inc. Storage arrays 207 implement a pool of up to terabytes of physical storage that may be configured into any number logical units (LUNs) of storage. Host bus adapters 209 provide an I/O interface between storage arrays 207 and I/O ports of switches 201/203, or to other host bus adapters 209. Host bus adapters 209 comprise one or two physical I/O channels that implement a compatible protocol with other devices such as a Fibre Channel (FC_PH) protocol.

Any number of workstations, server computers and the like, such as workstation 205, may be coupled to the distributed computing system using HBAs 209. Multiple HBAs may be used in to provide redundant connections. Multiple HBAs may also be used to provide connections to alternate devices or alternative switches. Hence, there may be several paths between any two devices where each of the paths will offer different performance depending on the devices that implement the path, current activity on the path, and other factors.

Examples of metrics that can be collected include:

TABLE 1

| Metric | Description |
| --- | --- |
| IOPs | A value indicating input/output operations per second. |
| Throughput | A value indicating the rate at which data is moving in megabytes per second. |
| Response time | A value indicating the time required to receive a response to a request. |
| Average queue depth | A number of transactions that are waiting to be processed at a port or subsystem behind other transactions. |
| Command receive to command issue time | Indicates how long a command sits idle in a queue. This may be an average number summarizing packets received over a period of time. |

In addition to the metrics shown in Table 1, it is useful to categorize performance based upon various features that describe a type of the input/output operations being performed. A particular configuration may perform well in some load conditions while having a very different performance under other load conditions. Table 2 gives some examples of operation type information that is used in some embodiments to further classify the performance information.

TABLE 2

| | |
| --- | --- |
| IO size | Indicates size of transaction packets being handled (e.g., 512, 1 K, 2 K, 4 k, . . . 1024 k) bytes per packet. |
| Random/ Sequential | Indicates whether the I/O transactions are related to random access transactions or sequential data transactions. |
| Read/ Write | Indicates whether the I/O transactions are related to read access transactions or write access transactions. |

As indicated in FIG. 2, various devices and paths between devices will exhibit varying throughput values, indicated by encircled values between connected devices, by design and/or as a result of device malfunction or current load conditions. Similarly, each other measured metric reveals the operating condition of a particular device, port or connection that may vary by design or as a result of current load conditions. Measuring, gathering, and managing these metrics are necessary in order to perform meaningful analysis on the system.

Granularity of the information is particularly important to enable certain types of analysis. However, increased granularity means that the quantity of performance data that is collected and must be managed becomes quite large. The quantity of data escalates even further when the variety of types of data that are collected is increased. Although the large quantities of data can be distilled or summarized, which is sometimes called "rolling up" the data, these processes of summarizing typically sacrifice the identity of the finer granularity data. For example, a set of IOP values for a plurality of ports in a network can be summarized as a single average IOP value, however, it is not possible to extract the IOP value for any particular port once the average is computed.

Figure 3:
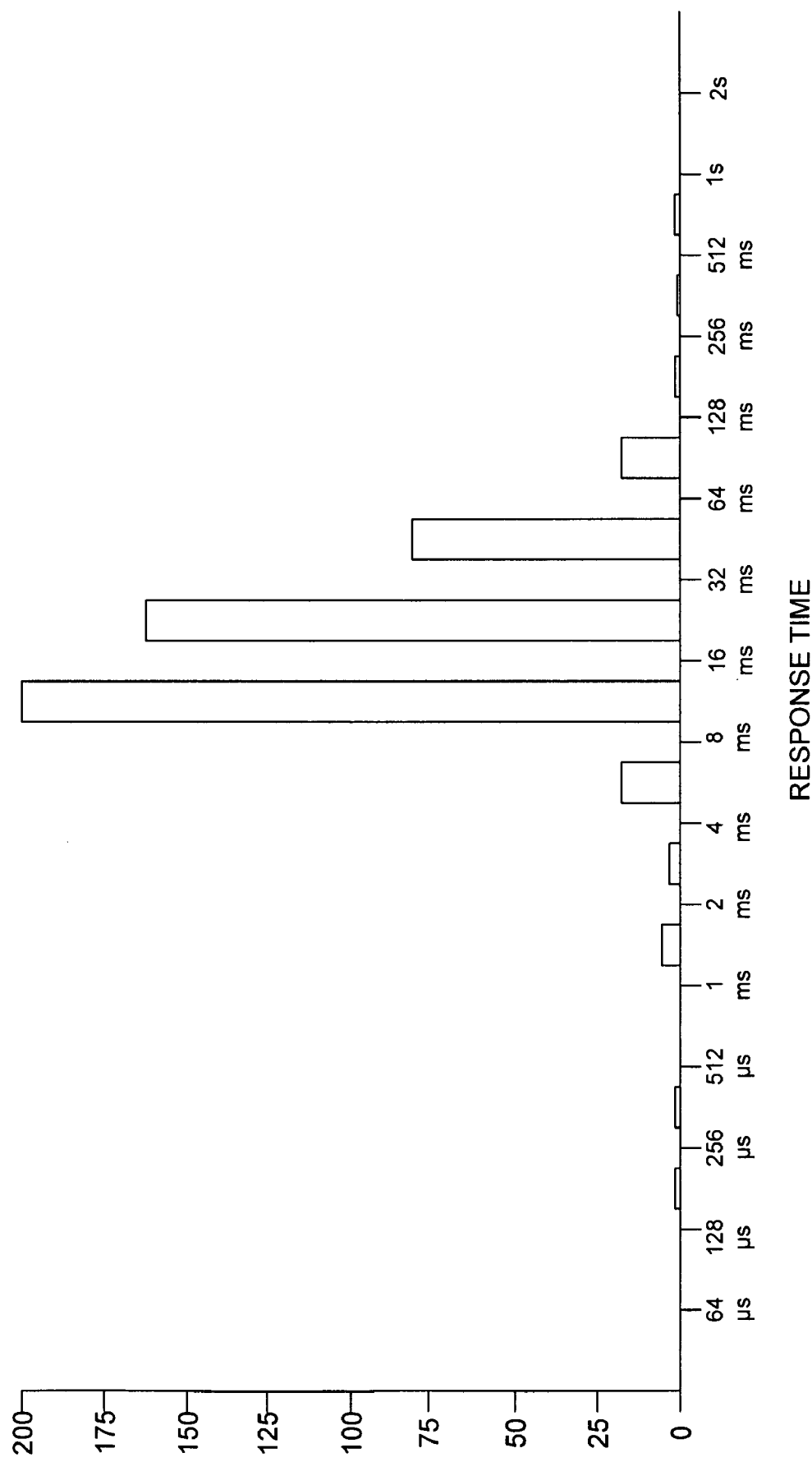
FIG. 3 illustrates an application of a data gathering method in accordance with the present invention.

The present invention recognizes that an efficient way to capture data is to create a plurality of categories, counters, or "buckets" where each bucket represents a range of values based on the log of the value that is being collected. Each time a metric is measured a counter associated with a particular bucket is incremented. By way of the specific example of FIG. 3, response time for approximately two thousand input/output operations (e.g., random read operations) is measured and each measurement is sorted into one of the logarithmically defined categories shown. In FIG. 3, approximately 200 measured commands had a response time of between 8 ms and 16 ms whereas some 89 commands exhibited a response time between 32 ms and 64 ms. This form of data collection captures extremes as well as distribution information, however, the quantity of data that is required to represent a large number of measurements is relatively small.

Figure 4:
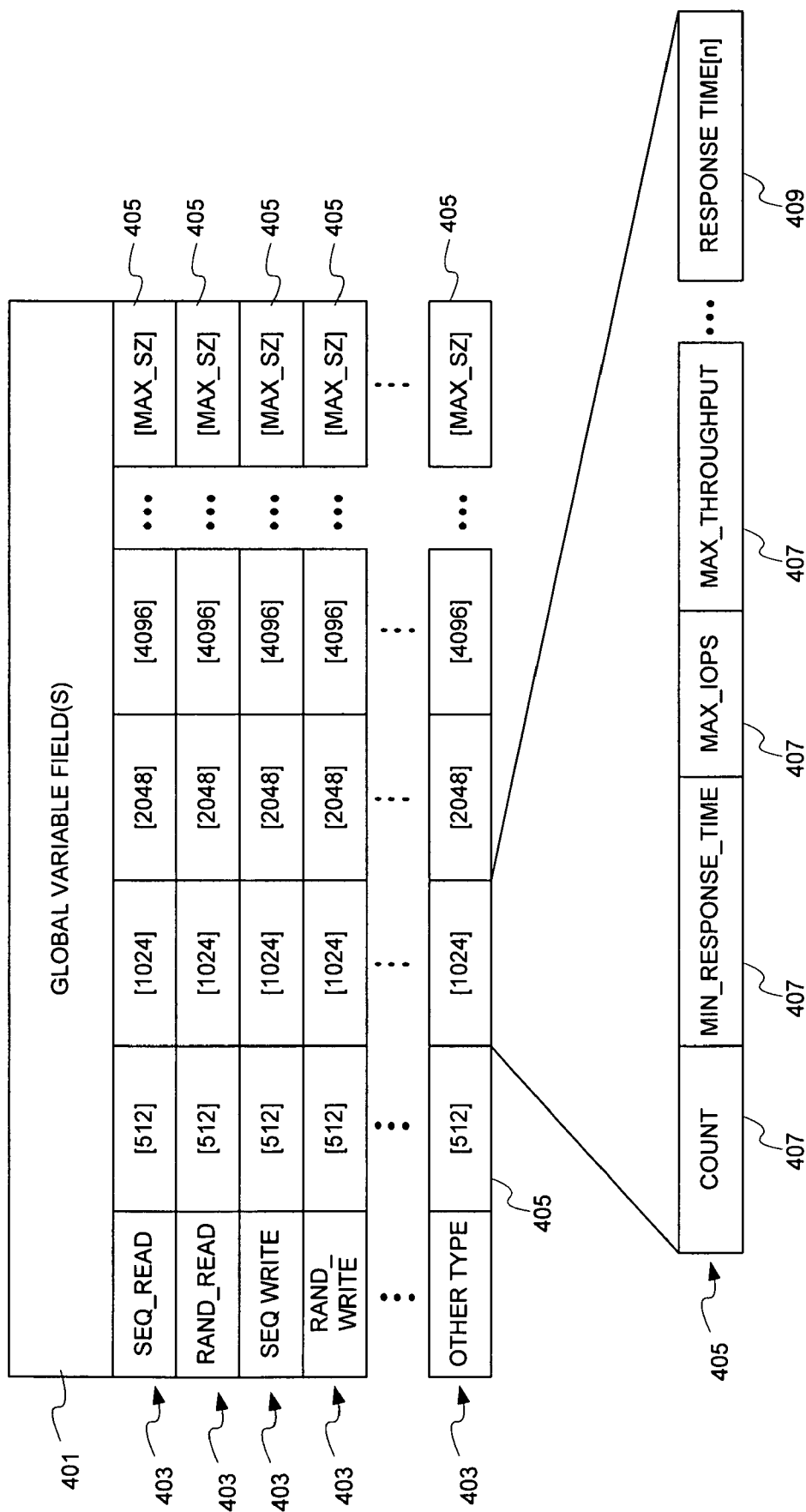
FIG. 4 shows an exemplary data structure in accordance with an embodiment of the present invention.

In a particular implementation instrumentation data is collected in a data structure, such as the example data structure shown in FIG. 4. The data structure can be implemented within memory of the device or ports being measured in which case the performance data is transmitted periodically or on demand to other devices that wish to know the performance data. Alternatively, a device can monitor the performance metrics of neighboring devices to which it is connected by implementing a data structure within its memory for all other devices to which it is connected. A data structure may be implemented as a unified data structure or in a distributed fashion by linked and related data structures. As another alternative, the data structures may be implemented in a centralized memory such as within management console 105/205.

An exemplary data structure shown in FIG. 4 includes various fields indicated in Table 3, Table 4 and Table 5. Table 3 indicates an exemplary set of "global" variables that may be collected at a device such as a port of a HBA, network, interface, switch, and the like. The global variables hold values indicating a cumulative amount of activity over a period of time spanning from the "time_last_cleared" to the "time_last_updated". The set of variables shown in Table 3 is exemplary only as other variables may be of interest in a particular application. The global variables maintained in Table 3 can be maintained irrespective of the type of IO operation. In other words, although the particular example is generally concerned with distinguishing sequential/random and read/write operations from each other, the global variables shown in Table 3 accumulate across all of these types. In addition to accumulating variables, the global variables in Table 3 might include minimum and peak values for measured properties of interest. Also, if desired, the information maintained in the global variables of Table 3 may be classified in a manner similar to the variables described in reference to Table 4.

TABLE 3

| Field | Description |
| --- | --- |
| time_last_cleared. | Datetime variable indicated a time at which the data structure was last cleared. |
| time_last_updated | Datetime variable indicated a time at which the data structure was last updated. |
| total_commands_rcvd | 64-byte integer value indicating total commands received. |
| total_commands_completed | 64-byte integer value indicating total commands completed. |
| total_bytes_received | 64-byte integer value indicating total bytes received. |
| total_bytes_sent | 64-byte integer value indicating total bytes sent. |

In the exemplary data structure shown in FIG. 4, fields holding the variables shown in Table 3 are maintained in the portion labeled "GLOBAL VARIABLES FIELD(s)", which may be of any size necessary to hold the information desired for a particular application. The remaining portion of the data structure in FIG. 4 is organized as a plurality of arrays 403 where each array 403 corresponds to a particular "type" classification. In the example, IO operations are classified into one of four types, sequential read, random read, sequential write, and random write. Each of these four classification corresponds to one of the arrays 403. Any number of arrays 403 may be used to meet the needs of a particular application. Moreover, it is contemplated that the arrays 403 may overlap in the sense that a particular IO operation may fall into multiple types and therefore trigger statistic gathering in more than one array 403.

Each array 403 comprises a number of elements 405 where each element 405 corresponds to a logarithmically indexed category. In the specific example, IO operations for each type are logarithmically classified based upon the size of the IO operation. Essentially, elements 405 represent "buckets" where each "bucket" holds information related to IO operations of a particular type (e.g., sequential read) and a particular range of sizes (e.g., less than 512 byte, 512-1024 byte, 1025-2048 byte, etc.) where each range is logarithmically defined. The granularity with which the ranges for each element 405 are defined can be selected to meet the needs of a particular implementation, as can the extent as indicated by the [MAX_SZ] variable in FIG. 4, and Table 6. In the case of IO operations, an exemplary MAX_SZ may be 1024 kilobyte in a Fibre Channel fabric implementation, although larger and smaller extents are contemplated. Each type array 403 may have its own MAX_SZ and granularity configuration, and so the number of elements 405 may vary from one array 403 to another array 403. The maximum size may be estimated, approximated, determined by historical records, or otherwise determined to meet the needs of a particular application.

Each element 405 comprises one or more fields, such as fields 407 in FIG. 4, that hold variables that indicate either instantaneous values, accumulated values, minimum/maximum values, and the like, such as the variables described in Table 5. Further, each element 405 may also hold one or more sub-arrays 409 that contain multiple values for statistics that represent a range. In the specific examples sub-arrays 409 are also logarithmically indexed such that each element (out of "n" total elements) of a sub-array 409 represents a range of values for the particular statistic where the range is logarithmically defined. By way of a specific example, the sub-array 409 in FIG. 4 can be configured to implement a set of 19 counters where each counter represents a particular range of response times corresponding to the example of FIG. 3.

TABLE 5

| Field | Description |
|---|---|
| Count | 32-byte integer variable indicating a counter value indicating a number of occurrences of a particular event. |
| min_response_time | 32-byte integer variable indicating a minimum response time in microseconds. |
| max_IOPs | 32-byte integer variable indicating a maximum number of IOPs in IOs per second. |
| max_throughput | 32-byte integer variable indicating a maximum throughput value in kb/s. |
| response_time_cnt[20] | A set of counters, twenty in this case, each of which comprises a 32-byte integer variable. |

TABLE 6

| Variable | Description |
|---|---|
| seq_read [MAX_SZ] | A variable indicating a maximum size for the sequential read operations for which data is being collected. |
| rand_read [MAX_SZ] | A variable indicating a maximum size for the random read operations for which data is being collected. |
| seq_write [MAX_SZ] | A variable indicating a maximum size for the sequential write operations for which data is being collected. |
| rand_write [MAX_SZ] | A variable indicating a maximum size for the random write operations for which data is being collected. |

As a particular example, a plurality of logarithmically-indexed performance data structures are implemented where each data structure corresponds to a range of I/O operation sizes. After an I/O operation is completed, the following accounting procedure is performed:

| | |
|---|---|
| sz_ix=MIN (LOG(io->size), MAX_SZ); | //the variable sz_ix is assigned a value which is either the LOG of the I/O operation size, or the maximum allowed size, whichever is smallest. |
| t=current_time-io->receive_time; | //the variable "t" holds the measured response time. |
| switch (io->type) { | //select the case depending on the type of I/O operation performed. |
| case RANDOM_READ; | |
| rand_read[sz_ix].count++; | //increment a counter that counts the number of times that a random read operation of a particular size range has occurred. |
| rand_read[sz_ix].response_time_cnt [MIN(LOG(t), LOG(MAX_TIME)]++; | //increment a logarithmically indexed counter that counts the number of times that a random read operation has had a measured response time in the logarithmically indexed range represented by that particular counter. |
| case RANDOM_WRITE; | |
| rand_write[sz_ix].count++; | //increment a counter that counts the number of times that a random write operation of a particular size range has occurred. |
| rand_write[sz_ix].response_time_cnt [MIN(LOG(t), LOG(MAX_TIME)]++; | //increment a logarithmically indexed counter that counts the number of times that a random write operation of a particular size range has had a measured response time in the logarithmically indexed range represented by that particular counter. |
| case SEQUENTIAL_READ; | |
| sec_read[sz_ix].count++; | //increment counter that counts the number of times that a sequential read operation of a particular size range has occurred. |
| seq_read[sz_ix].response_time_cnt [MIN(LOG(t), LOG(MAX_TIME)]++; | //increment a logarithmically indexed counter that counts the number of times that a sequential read operation of a particular size range has had a measured response time in the logarithmically indexed range represented by that particular counter. |
| case SEQUENTIAL_WRITE; | |
| seq_write[sz_ix].count++; | //increment a counter that counts the number of times that a sequential write operation of a particular size range has occurred. |
| seq_write[sz_ix].response_time_cnt [MIN(LOG(t), LOG(MAX_TIME)]++; | //increment a logarithmically indexed counter that counts the number of times that a sequential write operation of a particular size range has had a measured response time in the logarithmically indexed range represented by that particular counter. |
| time_last_updated=current_time; | //sets the variable indicating the last update time to the current time. |

The method of the present invention is efficient because the log of response time and the I/O sizes can be used as indices for the response time buckets or categories. Using base-2 logarithms to create indices is highly cost efficient from a computational standpoint as shift operations are efficiently performed by digital logic used in microcontrollers and microprocessors. Also most popular programming languages included operations for performing base-2 logarithms so that high level programming of the above process is readily performed. The specific implementation given above is readily adapted to other programming languages and computing environments.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer-readable storage medium tangibly embodying a program of instructions executable by a machine wherein said program of instruction comprises a plurality of program codes for management of a distributed computing network, said program of instruction comprising:
program code for one or more instrumentation processes having interfaces for generating performance metric values;
program code for a data structure having a plurality of logarithmically indexed counters; and
program code for processes that are responsive to the completion of an input/output operation and coupled to the instrumentation processes to receive the value of one of the performance metrics and increment a selected one of the indexed counters based upon the logarithm of the received value.

2. The program of instruction of claim 1 wherein the counters represent a plurality of categories wherein each category is associated with a range spanning from a starting point to an ending point and wherein the starting point and ending point define a logarithmic range.

3. The program of instruction of claim 1 wherein the counter is selected based upon a base-2 logarithm of the value of the performance metric.

4. The program of instruction of claim 1 wherein the program code for data structure comprises:
a first field holding a value indicating the maximum measured value for a particular performance metric that has occurred over a measurement period.

5. The program of instruction of claim 4 wherein the particular performance parameter is selected from the group consisting of: input/output operations per second (IOPs), throughput, and response time.

6. The program of instruction of claim 1 wherein the program code for the data structure implements a plurality of sets of logarithmically indexed counters where each set is associated with a particular type of loading and wherein the program code for the processes that select one of the indexed counters also select a particular one of the set of counters based upon the type of loading presented by the completed input/output operation.

7. The program of instruction software product of claim 6 wherein the type of loading information used to select a particular one of the sets of counters comprises information selected from the group consisting of: input/output operation size, whether the completed input output operation is random or sequential, and whether the completed input/output operation is a read or a write operation.

8. A management system for a distributed computing network comprising:
a management console having interfaces for accessing instrumentation information from a plurality of network-connected managed entities;
one or more instrumentation processes coupled to each of the network-connected managed entities and configured to gather performance metric values;
a first classification process responsive to a information describing a type of input/output operation being performed and configured to select one or more counters based upon the type of input/output operation being performed; and
a second classification process coupled to receive a performance metric value from the one or more instrumentation processes, wherein the second classification process is responsive to a computed logarithm of a measured value of at least one metric to select and increment a particular counter of the one or more counters selected by the first classification process.

9. The management system of claim 8 further comprising a data structure implementing the plurality of counters.

10. The management system of claim 9 wherein the counters represent a plurality of categories wherein each category is associated with a range spanning from a starting point to an ending point and wherein the starting point and ending point define a logarithmic range.

11. The management system of claim 8 wherein the first classification process is responsive to information selected from the group consisting of:
input/output operation size, whether the completed input output operation is random or sequential, and whether the completed input/output operation is a read or a write operation.

12. The management system of claim 8 wherein the second classification process performs a base-2 logarithm of the measured value of the at least one metric.

13. The management system of claim 8 wherein the at least one measured value used by the second classification process comprises response time of the input/output operation being performed.

14. The management system of claim 8 wherein the at least one measured value used by the second classification process comprises average queue depth of the input/output operation being performed.

15. The management system of claim 8 wherein the at least one measured value used by the second classification process comprises command receive to command issue time of the input/output operation being performed.

16. A computer implemented method for collecting performance statistics comprising:
Accessing, by said computer, instrumentation information from a plurality of network-connected managed entities;
in response to completing a particular input/output operation, identifying a set of counters comprising one or more counters based upon the type of operation that was completed; and
in response to completing the particular input/output operation, selecting a particular counter from the identified set of counters based upon a computed logarithm of a measured value of at least one metric; and
incrementing the selected counter.

17. The method of claim 16 wherein the act of selecting a particular counter from the identified set of counters based upon a computed logarithm uses a base-2 logarithmic computation.

18. A data structure implemented in a memory of a computing device, the data structure being configured for collecting performance statistics related to activity performed by the computing device, wherein the data structure comprises:
one or more arrays where each array corresponds to a particular type of activity of the computing device;
a plurality of elements within each array, wherein each element of the array corresponds to a logarithmically defined range for a selected characteristic of the activity being performed by the computing device;
a plurality of fields within each element of the array, wherein each field holds one or more values of a particular one of the performance statistics being gathered.

19. The data structure of claim 18 wherein at least one field within an element comprises a sub-array, wherein the sub-array has a plurality of elements and each of the plurality of elements in the sub-array corresponds to a logarithmically defined range for a selected characteristic of a performance statistic being gathered.

* * * * *

UNITED STATES PATENT AND TRADEMARK OFFICE
CERTIFICATE OF CORRECTION

PATENT NO. : 7,292,957 B1  Page 1 of 1
APPLICATION NO. : 11/043764
DATED : November 6, 2007
INVENTOR(S) : John C. Schell It is certified that error appears in the above-identified patent and that said Letters Patent is hereby corrected as shown below:

Column 9, line 43, delete "software product"

Signed and Sealed this

Twenty Second Day of April, 2008

JON W. DUDAS
*Director of the United States Patent and Trademark Office*